United States Patent [19]

Mogi

[11] Patent Number: 4,490,757
[45] Date of Patent: Dec. 25, 1984

[54] TAPE RECORDER

[75] Inventor: Toshio Mogi, Ayaseshi, Japan

[73] Assignees: Kabushiki Kaisha Welwod, Ayaseshi; Kabushiki Kaisha Takeuchi Sangyo, Kawasakishi, both of Japan

[21] Appl. No.: 416,254

[22] Filed: Sep. 9, 1982

[51] Int. Cl.³ .................. G11B 15/18; G11B 15/24
[52] U.S. Cl. ................................ 360/94; 242/200
[58] Field of Search ........................... 360/93–94, 360/137; 242/199–200

[56] References Cited

U.S. PATENT DOCUMENTS 3,964,099  6/1976  Sato ............................ 360/94
4,216,509  8/1980  Sato et al. .................... 360/94

FOREIGN PATENT DOCUMENTS 50-16913  2/1975  Japan .

Primary Examiner—John H. Wolff
Attorney, Agent, or Firm—Wenderoth, Lind & Ponack

[57] ABSTRACT

A tape recorder in which a pair of reel shafts are protruded from a cassette receiving surface on one side of which a magnetic recording/reproducing part, a pinch roller and a capstan are arranged sequentially is parallel with a line between said reel shafts, slits are symmetrically provided in reference to the center line between said reel shafts in said cassette receiving surface, said slits are arranged so that the end parts near said magnetic recording/reproducing part are close to the center line between said reel shafts while the other end parts are away from the center line between said reel shafts, the reel shafts are positioned in accordance with the distance between the reels of a cassette half in a different size by shifting said reel shafts symmetrically in said slits, a bearing pulley is provided at each of the roots of said pair of reel shafts, a driving device having an endless belt selectively depressed onto one of these bearing pulleys is provided between said bearing pulleys so that the parts of said endless belt opposing to said pair of reel shafts are moved along said slits and said pair of bearing pulleys are provided respectively with a brake having a pair of brake shoes along said pair of brake shoes so that said brake shoes can be applied to said pair of bearing pulleys from the direction of said magnetic recording-/reproducing part.

5 Claims, 7 Drawing Figures

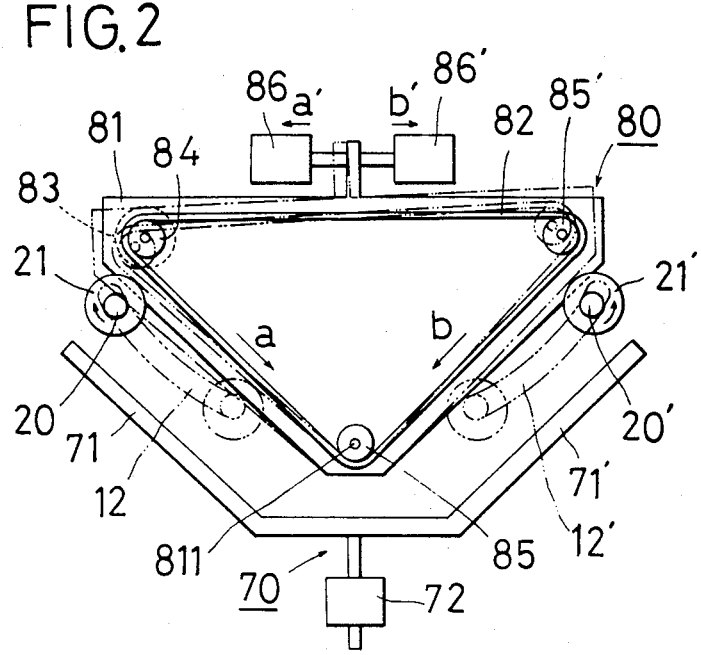
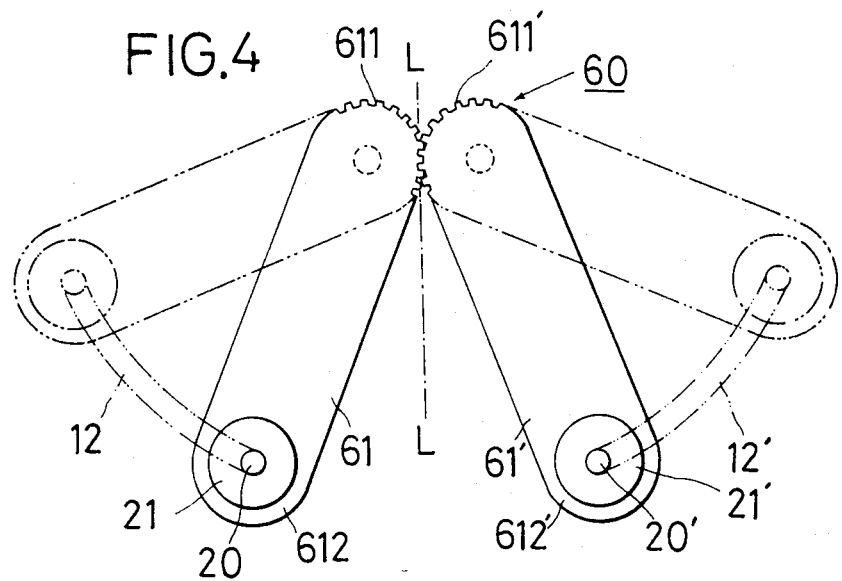

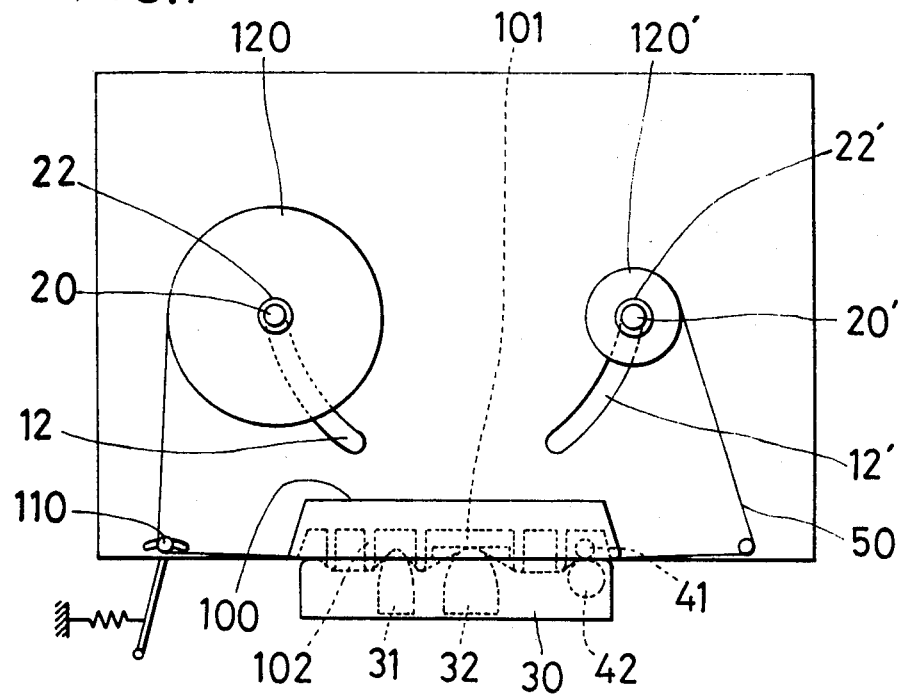
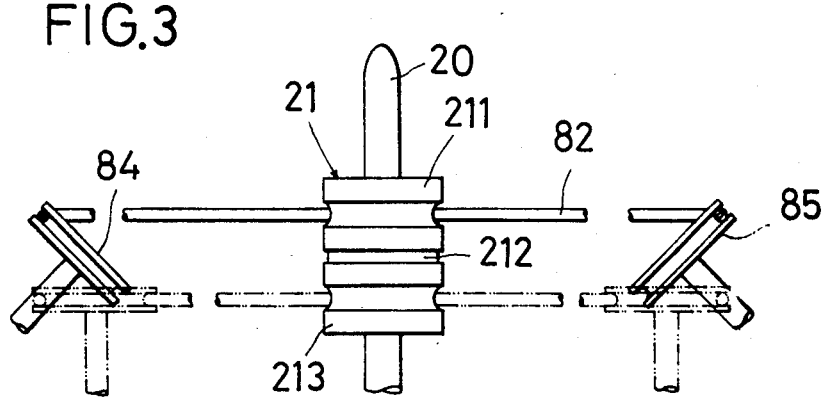

TAPE RECORDER

BACKGROUND OF THE INVENTION

The present invention relates to the tape recorder which can be used for a plurality of types of cassette halves with different dimensions by shifting the positions of the reel shafts.

This type of tape recorder is known from Japanese Utility Model Gazette laying-open No. 16913/1975.

Since the positions of the reel shafts of this type of tape recorder vary, the construction of the driving means for the reel shafts is difficult.

An object of the present invention is to provide the driving means capable of driving the reel shafts at respective shifting positions and staying itself at a fixed position.

Another object of the present invention is to provide the single brake mechanism capable of stopping the reel shafts at respective shifting positions.

SUMMARY OF THE INVENTION

The present invention provides a tape recorder in which a pair of reel shafts are protruded from a cassette receiving surface on which a cassette half is set, a recording/reproducing part is provided on one side of said cassette receiving surface parallel to the line between said reel shafts, a pair of slits for shifting said reel shafts are formed in said cassette receiving surface to be symmetrically in reference to the center line between said reel shafts so that the end parts of said slits near said recording/reproducing part are close to the center line between said reel shafts and the other parts of said slits are away from the center line as the reel shafts part from said recording/reproducing part, a tape feeding means is provided on at least one of the right and left sides of said recording/reproducing part to feed a magnetic tape from a reel on one of said reel shafts to a reel on the other reel shaft, a shifting means is provided for said pair of reel shafts to shift the reel shafts to respective symmetrical positions in reference to said center line, a bearing part is disposed at each of the roots of said pair of reel shafts to be selectively driven by a driving means which comprises an endless belt, such as, for example, a triangular endless belt which has a pair of extensions which are arranged in parallel to said pair of slits, a movable base such as, for example, pivotable plate onto which said endless belt is set by opposing said pair of extensions arranged along said pair of slits to respective bearing parts of said reel shafts, a deviating means which maintains said movable base at position at all times so that said endless belt set on the movable base does not come in contract with said bearing parts and deviates said movable base so that said endless belt is selectively depressed onto one of said bearing parts as required and a drive pulley which selectively runs said endless belt in either of forward and rearward directions, and brake mechanism having, for example, a pair of brake shoes which are arranged along said pair of slits is provided for the bearing parts of said pair of reel shafts, said brake shoes being depressed onto said bearing parts when said movable base is in a neutral position.

This tape recorder is provided with an adaptor, which is freely remountable, on the cassette receiving surface so that the magnetic tape is forced to contact the magnetic head of the recording/reproducing part by said adaptor when open reels are set and used on said pair of reel shafts.

For this purpose, said adpator is provided with a tape pad mechanism onto which the magnetic head of said recording/reproducing part is depressed and a tape guide for maintaining the magnetic tape at a specified position.

BRIEF DESCRIPTION OF THE DRAWINGS

In order that the invention may be more fully understood, preferred embodiments are now described with reference to the accompanying drawings, in which:

FIG. 2 is a plan view of the driving device of said tape recorder, FIG. 3 is a front view showing the embodiment of the reel shafts employed in said tape recorder, FIGS. 4 and 5 are respectively a plan view showing the embodiment of the reel shaft shifting means employed in said tape recorder, FIG. 7 is a plan view showing another embodiment of the tape recorder in accordance with the present invention.

DETAILED DESCRIPTION OF THE PREFERRED EMBODIMENTS

The following describes the tape recorder of the present invention referring to the accompanying drawings.

Figure 1:
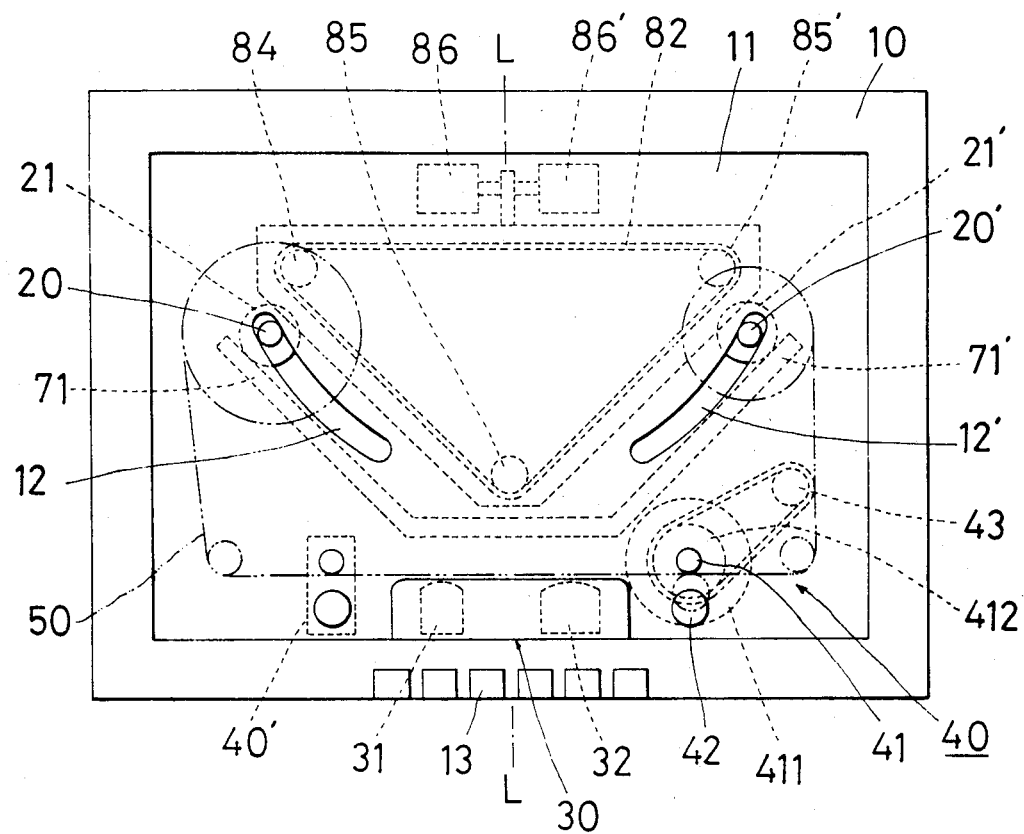
FIG. 1 is a plan view of the tape recorder in accordance with the present invention.

Referring to FIG. 1, there is shown the outer casing 10 in which a pair of reel shafts 20 and 20' are protruded from the cassette receiving surface 11 on which a cassette half is set, the recording/reproducing part 30 is provided at one side of the cassette receiving surface 11 in parallel with said reel shafts 20 and 20', and the group of magnetic heads such as the erasing head 31 and the recording/reproducing head 32 are arranged in said recording/reproducing part 30.

The capstan 41 and the pinch roller 42 are provided near said recording/reproducing part 30 as a tape feeding means 40 and the magnetic tape 50 is fed between and by said capstan 41 and the pinch roller 42. Though at least one tape feeding means 40 can be provided, the tape feeding means 40 in case of the embodiment is provided at both sides of the recording/reproducing part 30 to feed the magnetic tape 50 in forward and rearward directions.

As in case of conventional tape recorders, said pinch roller 42 is adapted to be shifted toward the capstan 41 and to depress the magnetic tape 50 onto the capstan 41 by pressing the play push button 13 after a cassette half has been set, and said recording/reproducing part 30 is adapted to come in contact with the cassette half in conjunction with the pinch roller 42.

Said reel shafts 20 and 20' are adapted to symmetrically move in the directions where the reel shafts approach and part from each other in reference to the center line L between these reel shafts as a border so that said reel shafts 20 and 20' move in a direction to approach the recording/reproducing part 30 when they approach each other and in a direction to part from one another; therefore the shifting means 60 is provided which shifts said pair of reel shafts 20 and 20' along the oblique slits 12 and 12' which are symmetrically provided to said center line L, for example, radially with a sector angle of 45° to the center line L.

Said shifting means 60 is constructed, as shown in FIG. 4, so that a set of arms 61 and 61' are engaged with each other by gears 611 and 611' which are formed at the roots of arms 61 and 61' and are pivoted around the engaging part as a pivotal point in a direction where the arm 61 and 61' approach or part from one another. Then, the reel shafts 20 and 20' can be provided at the pivotable ends 612 and 612' of arms 61 and 61' which are thus constructed or the arms 62 and 62' which are intersected each other can be pivoted at the point of intersection and the actuating member 64 can be provided at the edges of intersecting parts of the arms on said center line L between two arms, whereby the pivotable ends 621 and 621' of said arms 62 and 62' can be pivoted in a direction where said pivotable ends approach or part from one another and the reel shafts 20 and 20' can be provided at said pivotable ends 621 and 621'. Thus the construction can be selected as required.

In said embodiment, the shifting locus of the reel shafts 20 and 20' is a loose curve and therefore said slits 12 and 12' are formed to be arc-shaped along this shifting locus of the reels shafts.

Said reel shaft 20 and 20' correspondingly have the bearing parts 21 and 21' at their roots and the bearing part 21 comprises the fixed bearing member 211 such as, for example, a pulley and a frictional idler which is fixed on the reel shaft 20 and the slip bearing member 213 such as, for example, a pulley and a frictional idler which is connected to said fixed bearing member 211 through the slip member 212 as shown in FIG. 3.

Said capstan 41 is provided with the flywheel 411 and the pulley 412 as in cases of conventional tape recorders, and is driven by the drive motor 43.

For said reel shafts 20 and 20', the brake mechanism 70 is provided which has long brake shoes 71 and 71' and a driving means such as, for example, the solenoid 72 as shown in FIG. 2. Said brake mechanism serves to stop the reel shafts 20 and 20'. Said brake shoes 71 and 71' are depressed onto the bases of reel shafts 20 and 20' and the driving device 80 is disengaged from the reel shafts 20 and 20' when the reel shafts are stopped.

Said brake shoes 71 and 71' are extended in parallel to said slits 12 and 12' to stop the reel shafts 20 and 20' even though said reel shafts are at any positions. In this embodiments, accordingly, one brake mechanism 70 can stop the reel shafts 20 and 20' at all positions.

The tape recorder in accordance with the present invention is the same as conventional tape recorders in that the pinch roller 42 and the heads 31 and 32 of the recording/reproducing part 30 detach from the magnetic tape 50 during fast feeding and rewinding of the magnetic tape and the reel shaft 20 at the tape forwarding side of said reel shafts 20 and 20' is driven to rotate in the tape rewinding direction during rewinding of the magnetic tape. The tape recorder of the present invention employs the driving device 80 as shown in FIG. 2 since the positions of reel shafts 20 and 20' vary.

Said driving device 80 is provided with a movable base such as, for example pivotable plate 81 which has the pivot point 811 on the center line L between the reel shafts 20 and 20', drive belt 82 which is extended to form a triangle on said pivotable plate 81, drive pulley 84 which is coupled to the drive motor 83 which drives said drive belt 82 and is located at one corner of said triangle, two guide pulleys 85 and 85' which are arranged at two remaining corners of the triangle, and the deviating means such as, for example, a set of solenoids 86 and 86, which deviate said pivotable plate 81 to both sides of the center line L in reference to said pivot point 811 as a fulcrum. Said drive belt 82 is extended to form two sides opposing parallel to said slits 12 and 12' and said solenoids 86 and 86' are constructed to selectively depress said drive belt 82 onto the bearing parts of reel shafts 20 and 20' to rotate the reel shafts by deviating said pivotable plate 81.

One of said guide pulleys 85 and 85' and said drive pulley 84, for example, the guide pulley 85 is preferably arranged at said pivot point 811 as a fulcrum as shown in the embodiment but it is not limited to this embodiment.

In this embodiment, if said pivotable plate 81 is deviated in the direction a' by said solenoid 86 while said drive belt 82 is turned around in the direction a, the drive belt 82 is depressed with pressure onto the bearing part 21 of the reel shaft 20 as shown with the 2-dot broken line in FIG. 2, said reel shaft 20 can be rotated in the direction of rewinding shown with an arrowhead, whereas, if said pivotable plate 81 is deviated in the direction b' while said dribe belt 82 is turned around in the direction b, said reel shaft 20' can be rotated in the direction shown with an arrowhead since the drive belt 82 which is not shown is depressed with pressure onto the bearing part 21' of the reel shaft 20'.

And, in thid embodiment, since said drive belt 82 has two sides parallel to the movement passages of the reel shafts 20 and 20', that is, slits 12 and 12', the drive belt 82 can freely be engaged with and disengaged from the reel shafts 20 and 20' even though said reel shafts are shifted to, for example, a 2-dot broken line in said slits 12 and 12'.

The driving of said reel shaft 20' at the rewinding side for fast rewinding, recording and reproducing can be changed over by selectively making the fixed bearing member 211 and the slip bearing member 213 of the bearing part 21 of said reel shaft 20' contact the drive belt 82.

For this purpose, the drive belt 82 can be selectively opposed to the fixed bearing member 211 and the slip bearing member 213 by vertically moving the pivotable plate 81 of said driving device 80 or two drive belts 82 can be extended in parallel in upper and lower horizontal directions to oppose to the fixed bearing member 211 and the slip bearing member 213, respectively. Moreover, the rotation speed of the reel shafts 20 and 20' can be increased or decreased by varying the rotation speed of the drive motor 83. In the embodiment shown in FIG. 3, the drive pulley 84 and the guide pulleys 85 and 85' can be constructed to be tiltable so that the drive belt 82 is shifted from a position shown with a solid line to a position shown with a 2-dot broken line in accordance with the tilting angles of these pulleys.

In the above embodiment, the drive belt 82 is extended in the form of triangle. Since this driving device 80 can be adapted so that the drive belt 82 has two sides along the slits 12 and 12', said drive belt 82 can be extended in the form of pentagon or other form.

Figure 6:
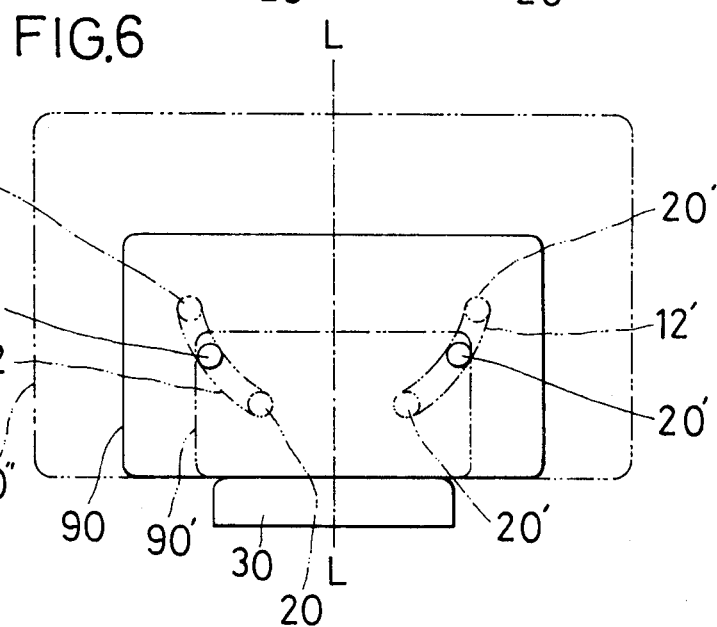
FIG. 6 is an explanatory view illustrating how to use the tape recorder according to the present invention.

The tape recorder of the present invention which is constructed as described above is advantageous in that the small size cassette half 90' and the large size cassette half 90" shown with 2-dot broken line can be used by shifting the reel shafts 20 and 20' from the solid line position which matches the common cassette half 90 to the 2-dot broken line position shown in FIG. 6.

Figure 5:
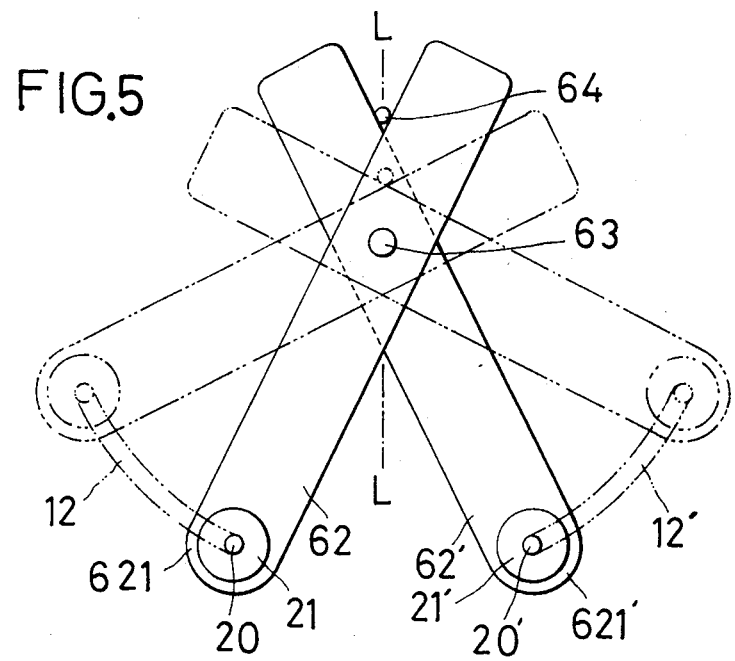

When this tape recorder is used as an open reel type tape recorder, the reel caps 22 and 22' are mounted on the reel shafts 20 and 20' as shown in FIG. 7 and the guide adaptor 100 which contains the tape pad mechanism 101 and the tape guide 102 in the cassette receiving surface 11 as shown in FIG. 5 is required to oppose to the recording/reproducing part 30 and to be freely remountable so that the tape pad mechanism 101 is positioned to face the magnetic head 32 of the recording/reproducing part 30 and the tape guide 102 is opposed to the recording/reproducing part 30 to maintain the tape at the specified position.

In other words, said guide adaptor 100 is separately required when the tape recorder for cassette halves is used for open reels since this tape recorder is not provided with the tape pad mechanism 101 and the tape guide 102.

Hereupon, the tape recorder in accordance with the present invention is preferably provided with the tape tension arm 110 as shown in FIG. 7 for use with large-sized cassette halves and open reels.

Since this tape tension arm 110 protrudes into the cassette half or contacts the magnetic tape 50 running between the open reels 120 and 120' to improve the running efficiency of the tape, it is necessary to arrange said tape tension arm so that it can be used both for the cassette half and for the open reel as shown.

What is claimed is:

1. A tape recorder comprising
   (a) an outer casing in which a pair of reel shafts are projected from a cassette receiving surface where a cassette is adapted to be secured, a recording/reproducing part is provided at one side parallel to a line between said reel shafts, and a pair of slits which are symmetrically provided in reference to the center line between said pair of reel shafts which are respectively protruded through each of said slits to permit shifting of said reel shafts along said slits and the end parts of said slits which face said recording/reproducing part are located near said center line,
   (b) at least one tape feeding means which is provided on said recording/reproducing part and one side of said outer casing,
   (c) a shifting means which shifts said pair of reel shafts along said slits so that said reel shafts are arranged at symmetrical positions in reference to said center line,
   (d) a bearing part which is provided at each of the roots of said pair of reel shafts,
   (e) a driving means which drives selectively the bearing parts of said pair of reel shafts to rotate said reel shafts in a tape rewinding direction and comprises
      (i) an endless belt which has a pair of extensions which are substantially parallel to said pair of slits and are opposed to the bearing parts of said pair of reel shafts,
      (ii) a drive pulley which selectively moves said endless belt in either of forward and reverse directions, and
      (iii) a movable base which is mounted with said endless belt and said drive pulley and located neutrally between the bearing parts of said pair of reel shafts to move so as to selectively depress said endless belt onto said bearing parts by a deviating means, and
   (f) a braking mechanism which stops said pair of reel shafts when said movable base is at a neutral position,
   wherein the distance between said reel shafts is adjustable to the distance between the reels of cassettes of different sizes by shifting said reel shafts.

2. A tape recorder in accordance with claim 1, wherein said endless belt is extended in the form of triangle by three pulleys.

3. A tape recorder in accordance with claim 2, wherein said movable base comprises a pivotable plate of which pivot point is located at an axis of a pulley, which is positioned on a center line between said reel shafts, of pulleys which guide said endless tape.

4. A tape recorder in accordance with claim 1, wherein said brake mechanism is provided with a pair of brake shoes which are extended along said slits to be applicable to the bearing parts of said pair of reel shafts by moving said brake shoes along the center line between said reel shafts.

5. A tape recorder in accordance with claim 1, wherein an adaptor, which is used when open reels are mounted on said pair of reel shafts, is remountably provided on a cassette receiving surface, said adaptor being provided with a tape pad mechanism which is depressed onto the magnetic head of said recording/reproducing part and a guide which maintains a magnetic tape in a specified position for recording/reproducing part.

* * * * *